Aug. 21, 1951 J. M. CHRISTMAN 2,565,020
RECIPROCATING CARRIAGE DRIVE
Filed July 13, 1946 5 Sheets-Sheet 3

INVENTOR.
John M. Christman.
BY
ATTORNEYS.

Aug. 21, 1951   J. M. CHRISTMAN   2,565,020
RECIPROCATING CARRIAGE DRIVE
Filed July 13, 1946   5 Sheets-Sheet 4

INVENTOR.
John M. Christman.
BY
Harness, Dickey & Pierce.
ATTORNEYS.

Aug. 21, 1951 J. M. CHRISTMAN 2,565,020
RECIPROCATING CARRIAGE DRIVE
Filed July 13, 1946 5 Sheets-Sheet 5
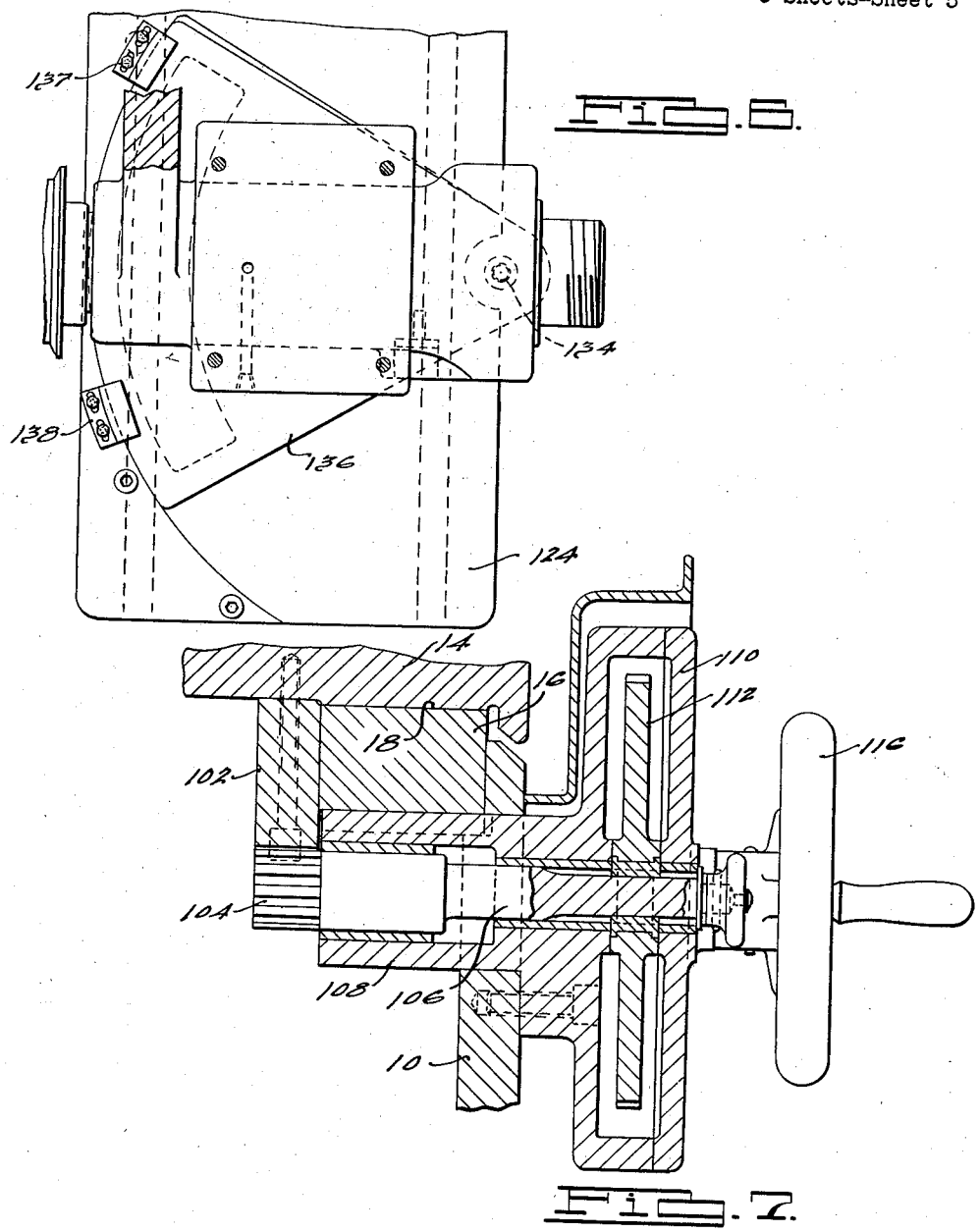
INVENTOR.
John M. Christman.
BY
Harness, Dickey & Pierce.
ATTORNEYS.

Patented Aug. 21, 1951

2,565,020

UNITED STATES PATENT OFFICE 2,565,020

RECIPROCATING CARRIAGE DRIVE

John M. Christman, Grosse Pointe Woods, Mich., assignor to The Sun Tool & Machine Co., Toledo, Ohio, a corporation of Ohio Application July 13, 1946, Serial No. 683,454

2 Claims. (Cl. 74—57)

This invention relates to grinding machines, and particularly to a grinding machine of novel and improved construction employing a continuously driven double lead feed screw and mechanism by which the lead screw reciprocates a work head.

The machine of the present invention employs the usual reciprocable table, slidably mounted upon a suitable base, carrying a work head having means to rotatably support a piece of work. It is desirable in a machine of this nature that movement of the table in each direction be at a uniform rate of speed and that reversal from one direction of travel to the other occur with no appreciable loss of time. Further, the length of the stroke of the table is very accurately maintained and it was found in actual practice that the table stops at the end of each cycle of reciprocation to within .0005 of an inch of any prior position.

To accomplish this desirable result, novel and improved means, which are substantially free of backlash, are provided in the machine of the present invention. A double lead feed screw which may be continuously driven at variable speeds is employed in the machine. Operative engagement between the feed screw and the table is accomplished by means of suitable brakes anchored to the table to alternately clamp a respective lead nut rotatably mounted on the feed screw. Backlash is eliminated from the mechanism by mounting the nuts with thrust bearings therebetween so as to prevent any axial movement of the nuts relative to each other or the table when the nut is secured thereto and through the operation of the nuts to always have the working face of each of the threads maintained in contact with the mating faces of the threads of the lead screw.

It is also desirable in a machine of this type to provide for manually shifting the table and for such purpose the operative engagement between the table and feed screw may be discontinued. At such time, the table may be shifted by a convenient manually operable handwheel adapted to actuate suitable gearing for shifting such table.

Another desirable feature consists in employing a work head having a swivel center substantially adjacent to the means for mounting a piece of work. This permits the grinding of relatively large angled tapers.

Accordingly, it is the general object of the present invention to provide a grinding machine of novel and improved design and mode of operation in accordance with the foregoing.

Another object of the present invention is to provide a grinding machine of the type mentioned employing a continuously driven double lead feed screw.

A further object of the present invention is to provide a grinding machine, employing a reciprocable table, in which backlash in the table operating mechanism for effecting its reciprocation is entirely eliminated.

A still further object of the present invention is to provide a grinding machine which has means for mounting a piece of work in such manner that relatively large angled tapers may be easily ground.

Other objects and features of novelty of the present invention will either be specifically pointed out or will become apparent when referring, for a better understanding of the present invention, to the following description taken in conjunction with the accompanying drawings, wherein:

Fig. 6 is an enlarged plan view of the work head with the driving motor illustrated in Fig. 3 omitted, and as viewed from line 6—6 thereof; and Fig. 7 is an enlarged sectional view of the structure illustrated in Figure 3, taken on the line 7—7 thereof.

Figure 1:
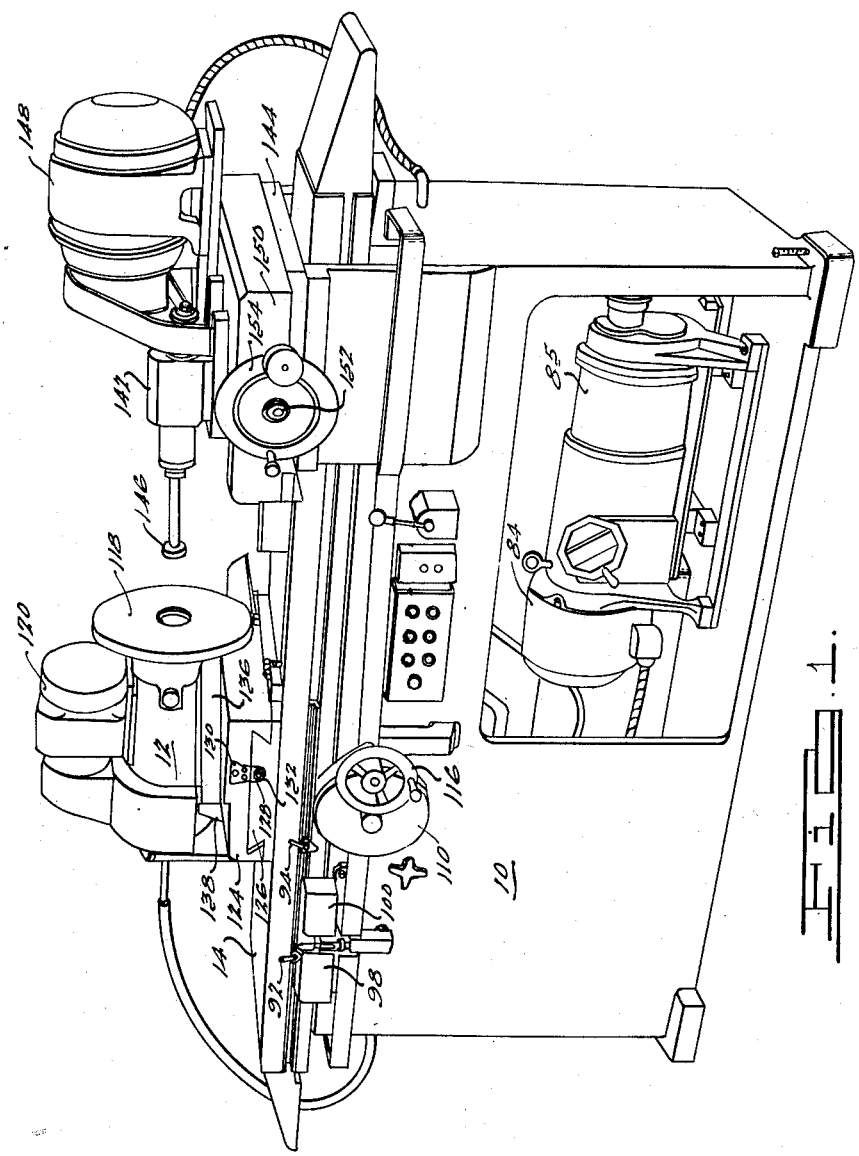
Figure 1 is a perspective view looking toward the front of a grinding machine embodying the improvements of the present invention and having cover plates removed to show the driving motor interiorly of the base.
Figure 2:
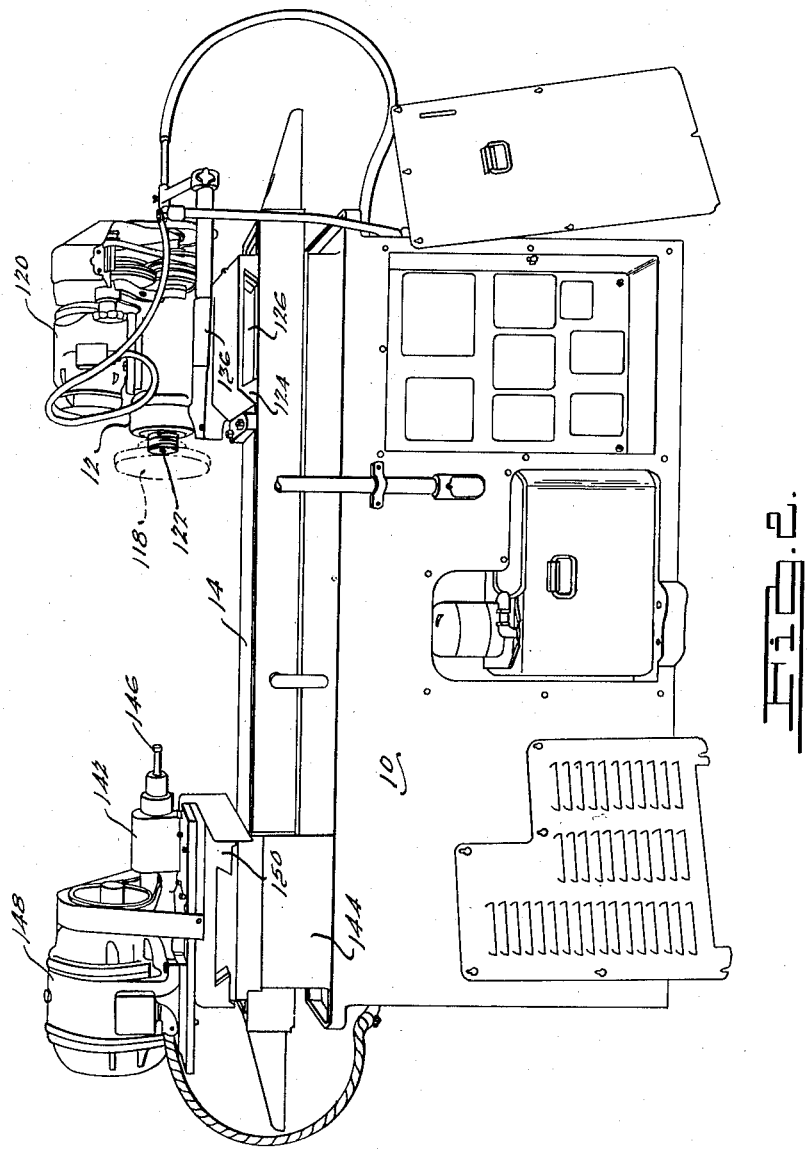
Fig. 2 is a perspective view looking toward the rear of the machine illustrated in Figure 1, with the cover plate removed therefrom to illustrate apparatus interiorly of the base.
Figure 3:
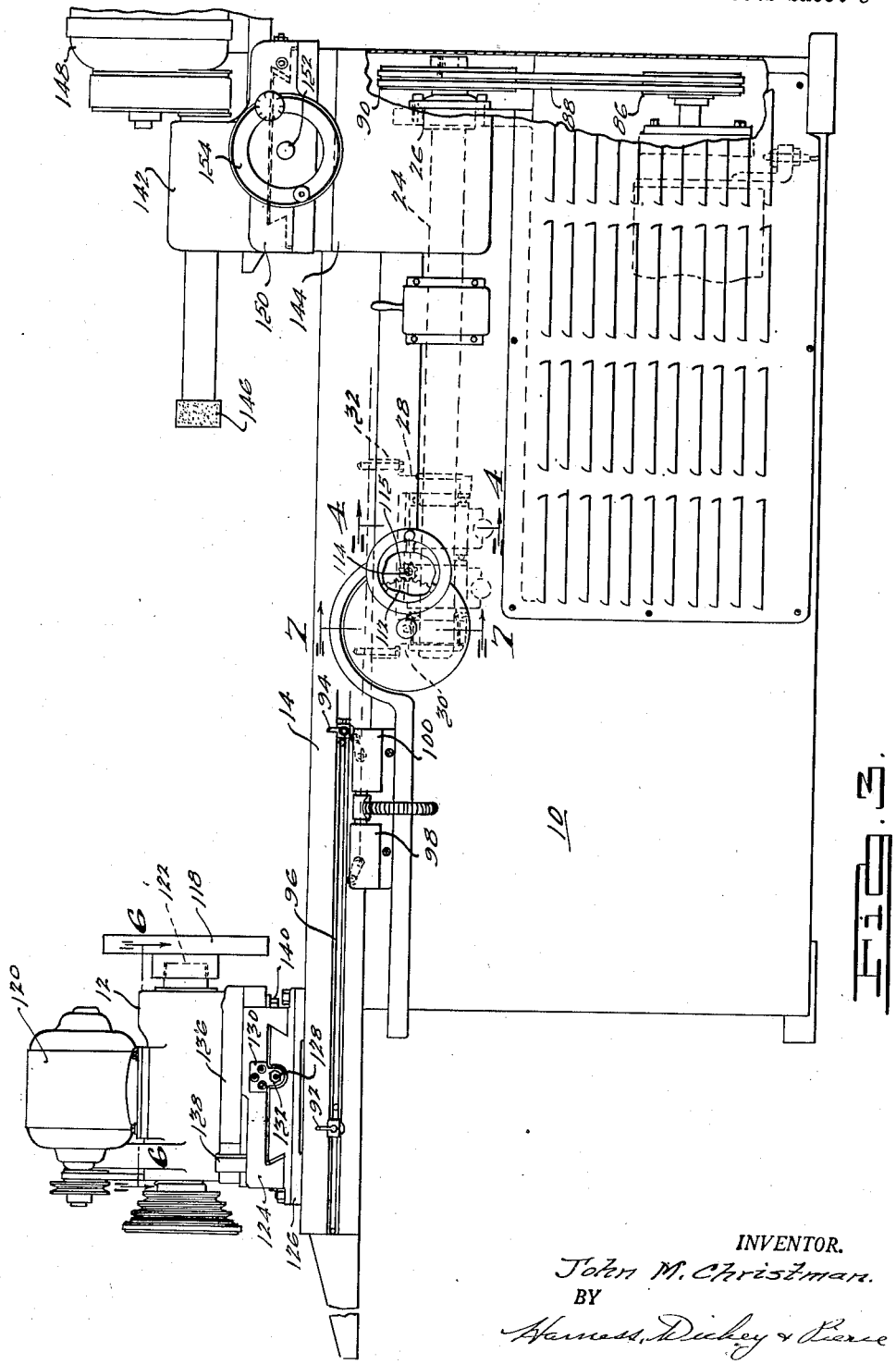
Fig. 3 is a front elevational view of the grinding machine of the present invention.

Referring to the figures for a more complete description of the grinding machine of the present invention, and particularly to Figures 1, 2 and 3, the machine is shown as being provided with a base generally indicated at 10. This base 10 may be a casting or fabricated from plates of such proportions and of sufficient strength to rigidly support certain of the apparatus of the grinding machine exteriorly thereof and also to provide for supporting a motor interiorly thereof as well as housing other mechanism. Openings therein, which may be covered in any suitable manner, are provided to gain access to the interiorly housed apparatus.

To provide for the reciprocation of a work head 12, which is to be later more fully described, such work head is mounted upon a table 14. This table 14 is in turn slidably mounted on the base 10, and to provide for such slidable movement of this table, a member 16 having a machined upper surface 18 and a saddle member 20 are mounted in the upper portion of the base 10. These members extend the length of the base and the table 14 is slidably supported by the same with the tongue 22 of the table 14 disposed within the V of the saddle 20.

This reciprocation of table 14 is accomplished by means of the double lead feed screw 24 journaled for rotation in a bearing 26 provided on the base 10 and in the brackets 28 and 30 depending from a bracket plate 32 which is anchored to the lower surface of table 14. A bushing 34 carried by bracket 28 and a threaded bushing 36 carried by bracket 30 rotatably supports the feed screw in a respective bracket and, as will hereinafter become more clear, the threaded bushing 36 provides for adjustment to prevent backlash in the mechanism.

As previously stated, this feed screw has a double lead, that is to say, double threads are provided on the same, one being a left-hand thread and the other being a right-hand thread.

A pair of lead nuts 38 and 40 which are threaded oppositely, that is to say, one has a left-hand thread and the other has a right-hand thread, are mounted in spaced relation on such feed screw to mate with a respective thread thereof. A ball thrust bearing assembly is positioned on the feed screw 24 between the lead nuts as indicated at 42. A similar ball bearing assembly 44 is positioned between the bracket 28 and the lead nut 40 and a bearing assembly, indicated at 46, is positioned between the bracket 30 and the lead nut 38. It will be observed that the bearing assembly 42 enters into abutting relationship with the lead nuts 38 and 40 and the bearing assemblies 44 and 46 enter into abutting relationship with a respective lead nut and a respective bracket. The threaded bushing 36 is adjusted to take up any axial play between the nuts so that they cannot shift axially relative to each other.

When the table is driven in one direction through the securement of the lead nut 38 in fixed relation thereto, the driving face of the lead nut thread is in engagement with the driving face of its mating thread on the lead screw. Since the lead nut 40 is disconnected from the table, the driving face of its thread will be maintained in driving relation with its mating thread of the lead screw while being free to rotate with the screw. When the lead nut 38 is released and the lead nut 40 is secured to the table, the working faces of the mating threads of the nut 40 and lead screw being in engagement with each other, will drive the table without any loss of motion between the threads or overrun of the table. Therefore no backlash can occur upon the reversal of table movement. The lead nut 38, when released, had the working face of its thread in contact with the working face of the thread of the lead screw so that no lost motion occurred between the lead nut 38 and the lead screw when being driven by the lead screw 40. When the lead screw 40 is again released and the lead screw 38 secured to the table, the drive between the lead nut 38 and the lead screw will occur without any lost motion as the working faces of the thread of the lead nuts and lead screw are maintained at all times in engagement with each other. No lost motion can occur when changing the direction of movement of the table both because of the engagement of the working faces of the threads of the lead nuts with those of the lead screw and because of the lack of any axial movement of the lead nuts relative to each other or their support. Even though some play may occur axially between the lead nuts, the fact that the working faces of the threads are always maintained in engagement would prevent any backlash occurring although some over-travel of the nuts relative to the movement of the table might occur due to play in the nut securing means. This, however, is prevented through the adjustment of the threaded bushing 36 which produces a drive through the thrust bearings and the supporting brackets 28 and 30. As pointed out hereinabove, the travel of the table is maintained within .0005 of an inch.

To effect driving engagement between the table 14 and feed screw 24, means are provided to enter alternately into clamping relationship with lead nuts 38 and 40. As may be seen in Figures 4 and 5, a brake generally indicated at 48 and another brake generally indicated at 50 are provided adjacent to each lead nut in position to close upon such nut to retain it against rotation and effect a driving engagement with the feed screw 24. Inasmuch as each brake is identical, only one is herein described. Thus, it may be seen in Figure 4, that brake 50 is provided with a pair of diametrically opposed curved arms 52 and 54 pinned at 56 and 58 to a plate 60 anchored to the lower surface of the bracket plate 32. The arms 52 and 54 are curved in such manner as to fit a diametrically opposite portion on the circumference of the lead nut 40 and it will be appreciated that as these arms are closed upon the lead nut, the nut is held against rotation and the nut and the table 14 will be driven by the lead screw in one direction.

The closing of the arms 52 and 54 upon a respective lead nut is brought about as follows. A T-pin 62 is slidably mounted in a crosshead 63 which is pivoted at 64 between the ends of the arm 52. Between the head of the T-pin 62 and the outer face of the crosshead 63, a compression spring 66 is mounted on the pin. A nut 65 on the pin is capable of abutting the inner face of the crosshead to render the spring inoperative. When the arms 52 and 54 are in the position indicated in Figure 4, the spring 66 exerts a force tending to close the arms 52 and 54 upon the lead nut 40, as will hereinafter become more clear.

To bring the T-pin 62 into operative position, there is fixed at the end of the pin a lever 68 which is adapted to be brought into alignment with a lever 70 to which the free end of the T-pin 62 is fixed in extension thereof. The lever 70 is pinned at 72 to arm 54 and at 74 to the lever 68. The lever is pivoted to a piston 76 which is actuated by means of a solenoid 78. A spring 80 secured to the bracket 82, which is anchored in any suitable manner to the previously described member 60 for supporting the solenoid 78. Normally the spring 80 tends to move the lever 70 upwardly to the position indicated by the dashed lines in Figure 4 and, when the lever 70 is in this position, the effectiveness of the spring 66 is lost due to the movement of the lever 68 and T-pin 62 to the left, as viewed in the figure, sufficiently to permit the nut 65 to strike the crosshead 63, the position indicated by the dashed lines in Figure 4. When this occurs, the curved arms 52 and 54 are separated and the brake no longer secures the lead nut 40 which is free to rotate with the lead screw and movement of table 14 in one direction is terminated.

Figure 4:
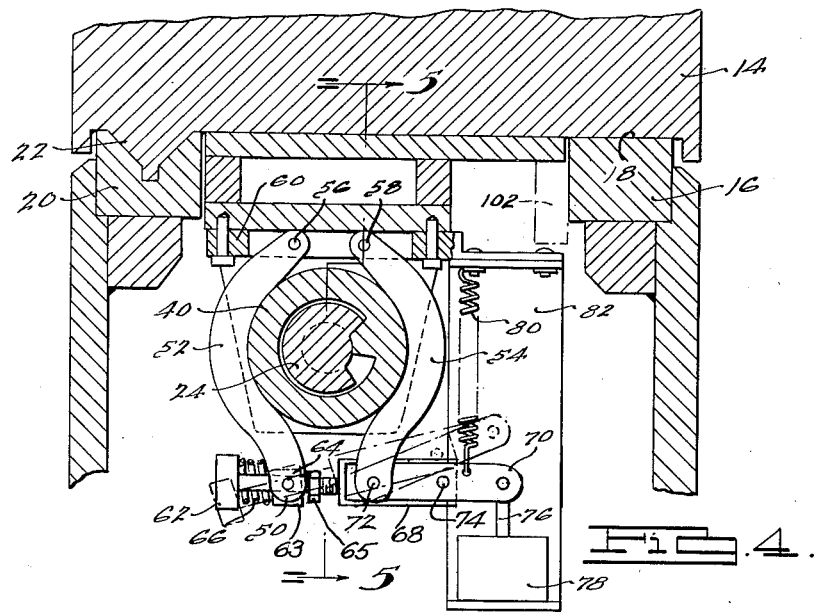
Fig. 4 is an enlarged sectional view of the structure illustrated in Figure 3, taken on the line 4—4 thereof.
Figure 5:
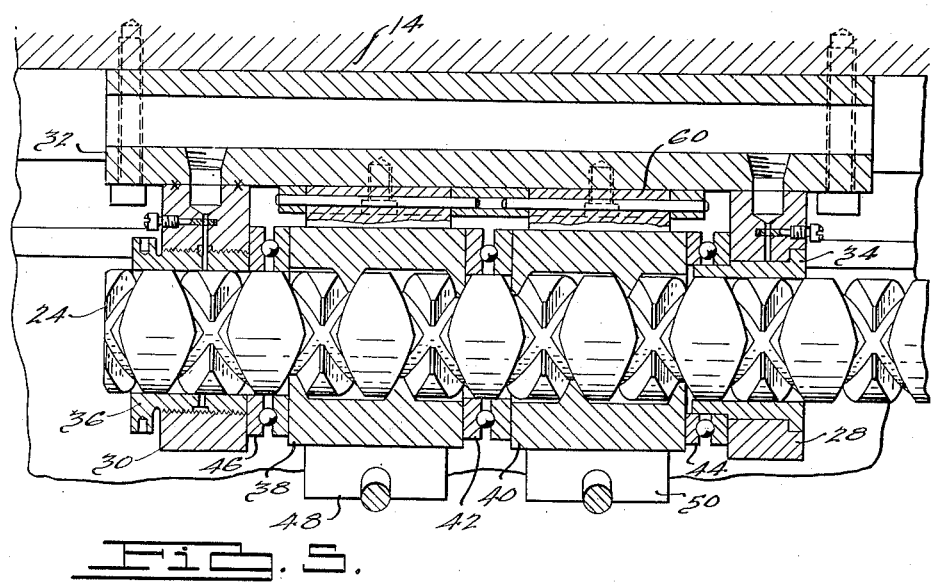
Fig. 5 is a sectional view of the structure illustrated in Figure 4, taken on the line 5—5 thereof.

Upon the actuation of the solenoid 78, the piston 76 moves inwardly, causing the lever 70 to move to the position illustrated in Figure 4. This shifts the lever 68 and T-pin 62 to the right moving the nut 65 away from the crosshead 63 and permitting the spring 66 to move the arms 52 and 54 toward each other to apply the brake to the lead nut 40 for preventing its rotation and thereby driving table 14 in one direction.

This solenoid brake herein described is manufactured by the Cutler-Hammer Manufacturing Company of Milwaukee, Wisconsin, and has been slightly altered to adapt the same for use in the grinding machine of the present invention, and is not further described herein as it or any well known solenoid actuated brake can be employed for engaging and securing the head against rotation.

The action of the brake 48 on the lead nut 38 is identical to that explained in connection with brake 50 and it will now be appreciated, inasmuch as the thread of lead nut 38 is opposite to the thread of lead nut 40, that upon alternately engaging the brakes 48 and 50 with their respective lead nuts, it is possible to effect reciprocation of the table 14.

The driving of the feed screw 24, to effect this reciprocation of the table 14, may be accomplished by means of a prime mover in the form of an electric motor 84. The motor drives through a speed reducer 85 and pulley 86 to drive a belt 88 and a pulley 90 integrally connected to the feed screw 24. Thus, it is possible by varying either the speed of the motor 84 or adjusting the speed reducer 85, to drive the feed screw 24 at variable speeds for effecting the reciprocation of the table 14 at any desirable speed.

To produce the automatic reciprocation of the table 14, dogs 92 and 94 are adjustably mounted in a T-slot 96 provided in the forward side of the table 14. The dogs 92 and 94, respectively, may be slidably adjusted in the T-slot 96 to provide the desired stroke for the table 14 and in this adjusted position are adapted to contact respectively switches 98 and 100. The switches effect the actuation of the solenoid 78 for the brake 50 and solenoid (not shown) for the brake 48 for causing such brakes to alternately engage a respective lead nut to effect travel of the table 14 first, in one direction, and then in the other. The electric circuits by which this actuation is accomplished are not described inasmuch as they may be any suitable circuit designed to accomplish this actuation in timed relation to the travel of the table 14.

When it is desired for purposes of set up or other reason to effect movement of the table 14 manually, the electrical connection to the switches 98 and 100 may be opened to prevent the actuation of the brakes 48 and 50. This frees lead nuts 38 and 40, so that they are free to rotate when the table is driven manually.

After the lead nuts are thus rendered ineffective, the table 14 may be shifted manually by means of the following mechanism. A rack 102, which may be seen in Figure 7, is anchored to depend from the lower surface of the table 14 and adapted to mesh a pinion 104. The pinion 104 is formed on the inner end of the shaft 106 which is journaled for rotation within the bearing housing 108, on the base 10, and in the bearing provided in a gear housing 110 attached to the outer face of the front wall of the base 10. At the other end of the shaft 106, a gear 112 is fixed to mesh with a pinion 114 which is mounted on a shaft 115 journaled for rotation in the gear housing 110 opposite to the shaft 106. The rotation of the pinion 114 may be accomplished by a conveniently accessible hand wheel 116 also attached to the shaft 115, and it will be seen that the rotation of this gear will effect a similar rotation of the gear 112 and the pinion 104, serving to shift the table 14 by means of the rack 102.

To provide for mounting a workpiece on the grinding machine of this invention, the previously mentioned workhead 12 which, as stated in the foregoing, is mounted on the table 14 provides a workholder 118. A workpiece may be secured in any suitable manner to the workholder 118 to be rotatably driven by means of a motor 120 mounted on the workhead 12. The motor drives the spindle 122 to which the workholder 118 may be fixed and such motor is independent of the main drive motor 84. The motor 120 is controlled by means of a separate electrical circuit, and consequently, it is not necessary that the work be driven continuously but only during the grinding operation.

This workhead 12 is mounted for movement in one direction transversely of the carriage 14 upon a cross slide 124 which is slidably mounted upon the dovetail of a base 126 secured to the table 14. Such transverse movement may be effected by means of a feed screw 128 which is rotatably supported in the base 126 and adapted to threadably engage a lead nut 130 carried by the slide 124. At one end of the feed screw 128, a nut 132 is fixed to which an operating handle may be attached for rotating the feed screw and also to serve as a stop for lead nut 130, preventing movement of slide 124 except in a direction away from the nut 132. It will be observed, therefore, that as the feed screw 128 is turned, the slide 125 will be shifted to move the workhead 12 in one direction, transversely of the table 14.

The workhead 12 may be also moved arcuately about a center 134 which serves as a pivot, as illustrated in Fig. 6. For this purpose, the workhead 12 is mounted upon a sector-shaped upper slide 136 adapted to be slidably moved arcuately about the center 134 on the cross slide 124. A pair of clamps 137 and 138 are mounted on the cross slide 124 to secure the upper slide 136 in adjusted position and may be released to permit the arcuate movement of upper slide.

The center 134 is integral with the upper slide 136 and extends through an opening provided therefor in the cross slide 124 where it is secured by a bolt 140. It will be noted that this center 134 is located adjacent to the workholder 118. This brings the point about which the work is pivoted for grinding a taper close to the work, making it possible to grind large angled tapers.

To mount a grinding head, generally indicated at 142, on the machine of the present invention, a bridge 144 is formed integral with the base 10 at one end of the base. The bridge 144 extends in a direction transversely of the table 14 and in overlying relation thereto so as to not interfere with its reciprocation. As the table 14 reciprocates, the workhead may bring a piece of work into engagement with a grinding wheel 146 driven by a motor 148 on the grinding head. Similar to the motor 120 on the workhead 12, the motor 148 is independent of the main drive motor 84 and is controlled by a separate electric circuit.

As in the case of the workhead 12, the grinding head is shiftable in one direction transversely of table 14. For this shifting, there is formed integrally with the grinding head 142, a cross slide 150. The slide 150 is adapted to be shifted laterally of the table 14, but opposite to the direction in which the cross slide 124 of the workhead may be shifted. The cross slide 150 is slidably positioned on a dovetail portion of the bridge 148 to be shifted by a feed screw 152. The feed screw 152 is rotatably journaled in the dovetail portion and adapted to threadably receive a lead nut (not shown) carried by cross slide 150. In order to effect rotation of feed screw 152, a hand wheel 154 is positioned conveniently at the outer end thereof.

Thus, with the workhead 12 shiftable laterally on the table 14 in one direction and, with grinding head 142 shiftable laterally on table 14 in an opposite direction, it is possible to accommodate on the grinding machine of the present invention a workpiece of considerable size.

From the foregoing, it will be appreciated that the grinding machine of the present invention is of novel and improved design and particularly provides novel and improved means for effecting reciprocation of a workpiece as the same is ground.

What is claimed is:

1. In a machine, a base, a table slidably mounted for reciprocation on said base, means mounting spaced brackets to depend from the bottom of said table, a double lead feed screw rotatably supported by said base and said brackets, separate lead nuts having opposite hand threads mounted in spaced relation on said feed screw and within said brackets, a separate thrust bearing between the lead nuts and between each lead nut and a respective bracket, a bushing in one bracket in surrounding relationship to said feed screw, and a pressure applying means carried by the other bracket to act on the adjacent thrust bearing for eliminating any axial movement between the nuts and table.

2. In a machine, a base, a table slidably mounted for reciprocation on said base, means mounting spaced brackets to depend from the bottom of said table, a double lead feed screw rotatably supported by said base and said brackets, separated lead nuts having opposite hand threads mounted in spaced relation on said feed screw and within said brackets, a separate thrust bearing between the lead nuts and between each lead nut and a respective bracket, a bushing in one bracket in surrounding relationship to said feed screw, and a rotatable bushing threadably retained by the other bracket adapted to be turned inwardly to bear upon the adjacent thrust bearing for eliminating any axial movement between the bearings, lead nuts and brackets.

JOHN M. CHRISTMAN.

REFERENCES CITED

The following references are of record in the file of this patent:

UNITED STATES PATENTS

| Number | Name | Date |
|---|---|---|
| 463,017 | Wheeler | Nov. 10, 1891 |
| 856,978 | Mowat | June 11, 1907 |
| 1,186,616 | Strecker | June 13, 1916 |
| 1,392,172 | Keller | Sept. 27, 1921 |
| 1,558,721 | Thompson | Oct. 27, 1925 |
| 1,896,752 | Raule | Feb. 7, 1933 |
| 2,389,224 | Wessman | Nov. 20, 1945 |